(No Model.) 2 Sheets—Sheet 1.
J. HUMES.
ICE MAKING APPARATUS.
No. 564,486. Patented July 21, 1896.
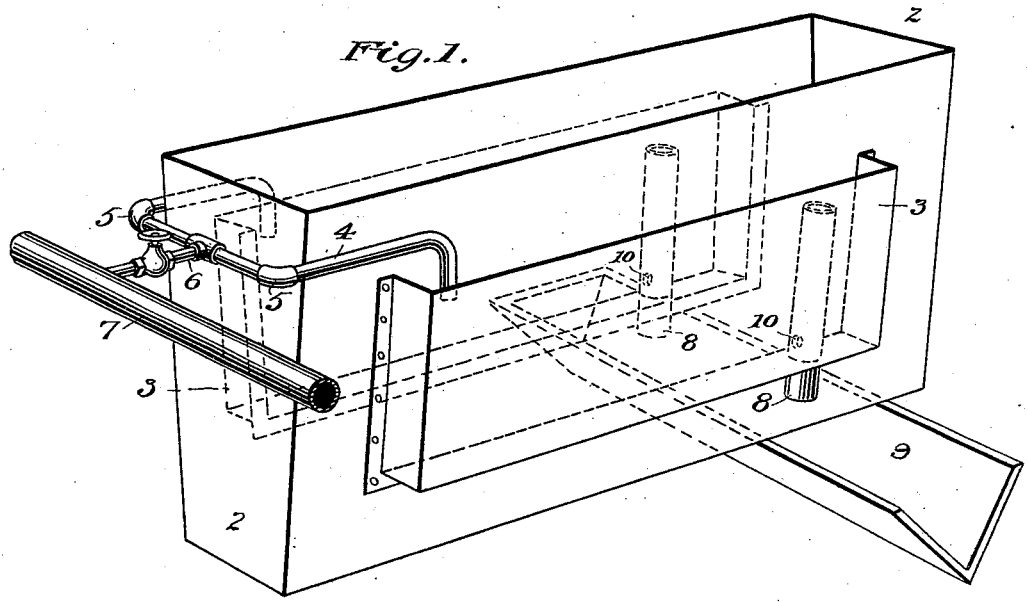
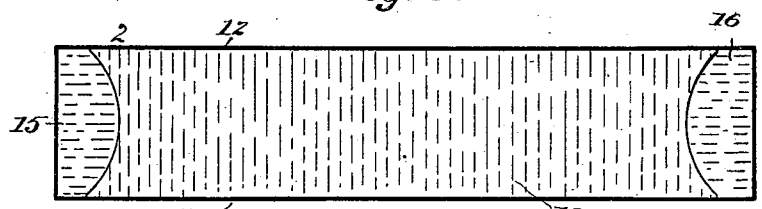
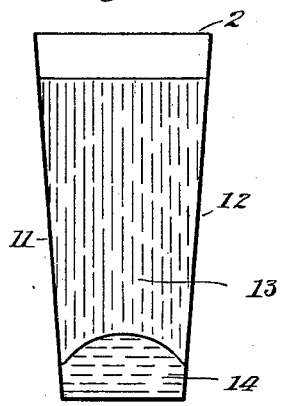
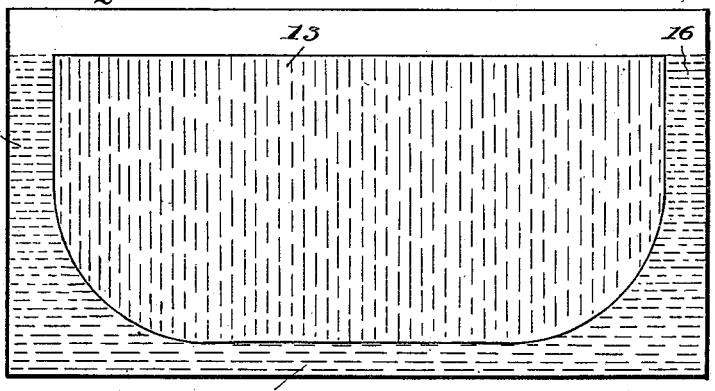
WITNESSES:
INVENTOR
James Humes,
BY
Fowler & Fowler
ATTORNEYS.

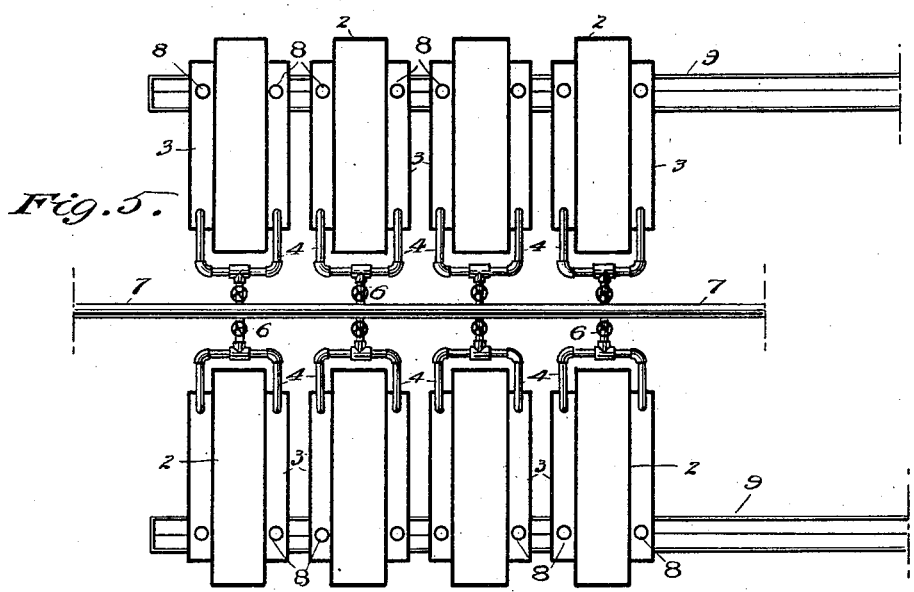

UNITED STATES PATENT OFFICE.

JAMES HUMES, OF NEW YORK, N. Y.

ICE-MAKING APPARATUS.

SPECIFICATION forming part of Letters Patent No. 564,486, dated July 21, 1896.

Application filed April 29, 1895. Serial No. 547,473. (No model.)

*To all whom it may concern:*

Be it known that I, JAMES HUMES, a citizen of the United States, residing at New York city, county and State of New York, have invented certain new and useful Improvements in Apparatus for Making Ice, of which the following is such a full, clear, and exact description as will enable any one skilled in the art to which it appertains to make and use the same, reference being had to the accompanying drawings, forming part of this specification.

My invention relates to the artificial production of ice, and the principal objects are to obtain good and practically clear ice from undistilled water and to quicken the freezing process, whereby a great saving in the cost of production is effected.

The invention consists in the various peculiar and novel arrangements and combinations of the several parts of the apparatus, all as hereinafter fully described, and then pointed out in the claims.

In order that my invention may be fully understood, I have illustrated a type of my apparatus in the accompanying drawings, wherein—

Figure 1 is a perspective view of one of my improved freezing vessels or cans arranged in connection with the pipes for the freezing mixture or brine and a drain trough or conduit for returning the freezing mixture to the refrigerating-coils after it has been used. Figs. 2, 3, and 4 show, respectively, a vertical cross-section, a horizontal section, and a longitudinal vertical section of the freezing vessel and its contents after the freezing process has been completed, the side compartments for the freezing mixture being omitted. Fig. 5 is a plan view of a set or system of freezing vessels like that contained in Fig. 1.

Referring to the drawings, in which like numbers of reference indicate like parts throughout, 2 designates a four-sides open-top metallic can or vessel which is quite narrow compared with its length and contracts or tapers slightly from the top toward the bottom, as clearly indicated in Figs. 1 and 2. Upon each of the two long sides of this vessel is arranged a pocket or chamber 3 for containing the brine or other suitable freezing medium. These freezing-mixture pockets, which are located directly opposite each other, are illustrated as open at the top and the freezing mixture, such as the ordinary brine, is introduced into the same through a nozzle 4, which may be turned or swung slightly on its joint 5 where it is connected with the pipe 6 leading from the main supply-pipe 7. The purpose of having the nozzle movable is to raise it clear of the can or vessel when it is desired to remove the latter after the freezing process has been completed and when it is desired to extract the block of ice thus formed.

The outlet-pipe 8 of the pocket or chamber 3 empties into a drain trough or conduit 9. This outlet-pipe extends through the bottom of the pocket and up to the point therein to which it is desired to keep the level of the brine. A small opening 10 is formed in the pipe at the bottom of the pocket and the brine is continually discharged through it and is thus caused to circulate through the pocket. In case the brine rises above its normal level, it will overflow into the top of the drain-pipe, which is of such capacity as to readily lead off the surplus and prevent the brine from overflowing the pocket.

In Fig. 5 I show a set of the freezing vessels constructed after the manner just described, each of the same being supplied with the refrigerated brine by a supply-pipe 7, which leads from the refrigerating-coils. (Not shown.) These individual vessels are arranged side by side and the freezing-compartment of each is supplied with brine through the movable nozzles 4, which are connected with branch pipe 6, each of which has a valve which may be turned by hand to let on the brine or cut it off, as the case may be. Each row of the vessels is provided with a drain-trough 9, into which the drain-pipes 8 of the brine-compartments 3 discharge themselves. These troughs return the brine which has been used to the refrigerating-coils, where its temperature is again lowered before it is brought back to effect the freezing again. This arrangement is found to be very compact and all parts of the apparatus are readily accessible for the purpose of inspection or repairs, but the most important advantage arising from it is that each freezing vessel or can is individually removable without necessitating the disturbance of any of the others or in any way interfering with the freezing process taking place in each. Thus each can may be readily removed by shutting off its supply of brine and turning up the nozzles 4 out of the way when its block of ice has been formed therein and it is desired to remove it.

Having reference now to the vessel just described, it is used as follows: The vessel, being placed in a room or compartment of temperature somewhat above freezing, is filled with water nearly to its top. The freezing mixture or brine is then circulated through the compartments or pockets at the sides of the vessel. The water first begins to freeze on the inner walls 11 and 12 of the vessel over the area thereof to which the freezing temperature is thus directly applied. The ice continues to form in this way and it gradually extends a slight way out beyond the boundaries of the area or zone to which the freezing temperature is directly applied, and it continues to thicken until the layers or bodies of ice meet and form themselves into a solid block, as indicated at 13, in Figs. 2, 3, and 4. As the freezing temperature is not applied to the body of water at any points other than those in the vicinity of the compartments or pockets containing the brine, all the remaining parts are maintained at a point above the freezing temperature to prevent the water from freezing at such places, and this results in preserving a body of water 14 in the bottom of the vessel, as well as a column of water at each end, (shown at 15 and 16,) so that all sediment will descend into this lower stratum of water and escape, being frozen in the ice, and the air naturally contained in the water finds an easy exit into the end columns of water, through which it may rise to the surface as the freezing progresses. It will thus be seen that the ice may be formed rapidly owing to the fact that the freezing takes place simultaneously upon each of the inner walls of the vessel and continues to freeze until it comes together in a solid block, although the freezing may be stopped short of this point. This protection or insulation against the application of the freezing temperature to the particular parts referred to may be brought about either by keeping in contact with said parts air that is always somewhat above freezing temperature, as shown.

Having thus described my invention, what I claim, and desire to secure by Letters Patent, is—

1. A freezing vessel or can having on one or more of its sides a freezing-mixture compartment extending over less than the whole of the area of said side or sides, and having the remaining portions of said side or sides and the bottom insulated or protected against freezing temperature.

2. In ice-making apparatus, the combination of a set of separate portable freezing vessels 2, 2, each consisting of a portable can provided upon one side or two opposite sides with a pocket or chamber 3 extending over less than the whole of the area of said side or sides, an eduction-pipe for said pocket or pockets, a main supply-pipe 7 for introducing the freezing mixture to said pockets and movable pipe connections 4 4 detachably connecting the main pipe with the freezing-pockets whereby each can may be individually removed, substantially as and for the purpose set forth.

3. A freezing vessel or can, having on one or more of its sides a freezing-compartment extending over less than the whole of the area of said side or sides, and having other portions of the surface of the can insulated or protected against freezing temperature.

In testimony whereof I have hereunto set my hand, this 26th day of April, 1895, in the presence of the two subscribing witnesses.

JAMES HUMES.

Witnesses:
WILLIS FOWLER,
GEORGE R. BALDWIN.